Figure 1:
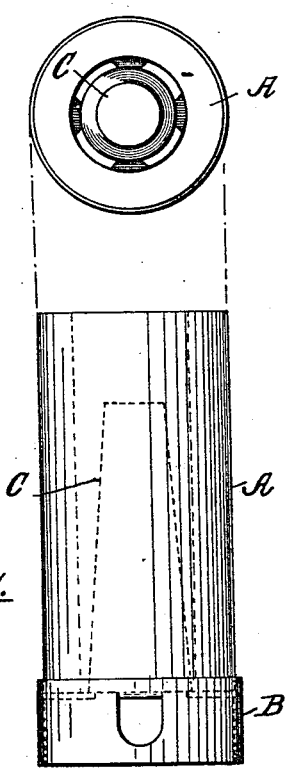

No. 735,660. PATENTED AUG. 4, 1903.
L. FEVAL.
FORMALDEHYDE FUMIGATOR.
APPLICATION FILED JUNE 6, 1902.
NO MODEL.

Witnesses: Frdk C. Fischer. Hugo Boepple Jr.

Inventor. Léon Feval

No. 735,660. Patented August 4, 1903.

UNITED STATES PATENT OFFICE.

LEON FEVAL, OF NEW BRUNSWICK, NEW JERSEY.

FORMALDEHYDE-FUMIGATOR.

SPECIFICATION forming part of Letters Patent No. 735,660, dated August 4, 1903.

Original application filed March 22, 1902, Serial No. 99,393. Divided and this application filed June 6, 1902. Serial No. 110,405. (No model.)

*To all whom it may concern:*

Be it known that I, LEON FEVAL, a citizen of the Republic of France, and a resident of the city of New Brunswick, in the county of Middlesex and State of New Jersey, have invented a certain new and useful Improvement in Formaldehyde-Fumigators, of which the following is a specification.

The object of my invention is to produce a simple, cheap, and effective means for producing formaldehyde gas in small quantities for various uses and particularly for disinfecting and sterilizing purposes.

Heretofore formaldehyde gas for disinfecting as well as other purposes has been obtained direct from methyl alcohol by well-known forms of generators or from formaldehyde solution by well-known forms of regenerators, whereby the formaldehyde is reverted into the gaseous state, or from the polymers of formaldehyde, generally known as "paraform," "paraformaldehyde," and "trioxymethylene," by heating said material, which, as is well known, reverts to the gaseous form when heated to about 130° centigrade. The application of heat to the polymers of formaldehyde for this purpose has been accomplished in various ways—such, for instance, by an alcohol-lamp placed under a suitable container in which the material is placed, or by a combustible substance placed in proximity to a candle or tablet of such material, or, as shown in my Patent No. 676,814, dated June 18, 1901, by burning part of the material, and in which instance the material is formed into a candle or cylindrical block, either pure or mixed with some other substance, and which candle or block is in a metallic container and wherein the candle is designed to be ignited at the bottom. The heat developed by the burning of the lower end of the candle causes the material of the bulk of the candle to revert to or give off formaldehyde gas.

My present invention is an improvement over the arrangements heretofore devised for obtaining formaldehyde gas from the polymers of the formaldehyde, and particularly over the device shown in said Letters Patent.

It is well known that in generating formaldehyde gas unless the gas is caused to mix or combine with a sufficient quantity of watery vapor the formaldehyde gas will polymerize and form what is generally known as "paraform," "paraformaldehyde," and "trioxymethylene." It is also well known that if these polymers of formaldehyde are heated to the proper degree they will revert to the gaseous state and that said gas will repolymerize unless it is caused to mix or combine with a suitable quantity of watery vapor. It is also well known that in generating formaldehyde gas from methyl alcohol or regenerating formaldehyde gas from formaldehyde solution the water present in both instances is converted into vapor, which mixes or combines with the gas and prevents polymerization, thus making the gas effective for disinfection and sterilization.

Various ways have been heretofore proposed for causing the mixture or combination of watery vapor with formaldehyde gas obtained from the polymers of formaldehyde. In one well-known form of apparatus tablets of paraform are heated in a suitable container by the flame of an alcohol-lamp, and the apparatus is so designed that the watery vapor produced by the combustion of the alcohol is caused to mix or combine with the formaldehyde gas, so as to prevent repolymerization. In the device shown in my patent above referred to the moisture of the atmosphere was depended upon to prevent repolymerization; but I have found in practice that repolymerization is not prevented in all localities.

In carrying my present invention into effect I preferably make a mixture of four parts of paraform, paraformaldehyde, or trioxymethylene and four parts of a saturated solution of calcium chlorid. As a substitute for the calcium chlorid I may employ two parts of water and two parts of glycerin. The proportion of these two mixtures might be varied without departing from the spirit of my invention. The purpose of the water in these two mixtures is to furnish sufficient moisture to prevent the repolymerization of the formaldehyde when the mixture is heated. The purpose of the calcium chlorid or cerin in such mixtures is to prevent the water of the mixture from vaporizing before the heat is sufficient to cause the mixture to give off formaldehyde gas. If the chemical salt or the glycerin were not employed, the water would vaporize before formaldehyde gas is given off. It will therefore be seen that by the addition of the chemical salt or glycerin in such quantity that the water of the moisture will vaporize at approximately the same temperature at which formaldehyde gas is given off I am enabled to maintain the formaldehyde gas so produced in a gaseous state—that is to say, preventing repolymerization—and thereby obtain effective disinfection or sterilization. This mixture may be molded into any desired form for commercial use, and in practice may be heated by any well-known means to the desired temperature—that is to say, a tablet or block of this mixture might be heated over a lamp or by being placed in proximity to or in contact with any suitable combustible substance which will burn at a comparative slow and uniform rate. In the preferred form, however, I mold the mixture in cylindrical or other tubular form and apply the heat internally by means of a heater composed of a combustible material adapted to be placed in the bore of the fumigator and which when ignited burns at a slow rate and practically without flame. This heater in some instances might be an ordinary candle or wick soaked in alcohol or other inflammable liquid, or it might be a block of the so-called "solidified alcohol," which is a palmate or oleate of sodium or any soap containing a large percentage of alcohol; but in the preferred form this heater is a stick composed of powdered charcoal made into a paste containing about two per cent. of nitrate of potash or nitrate of soda to support combustion and a sufficient solution of an adhesive substance. This mixture may be molded or pressed into any desired form according to the shape given to the fumigator.

My invention is illustrated in the accompanying drawings, in which—

Figure 2:
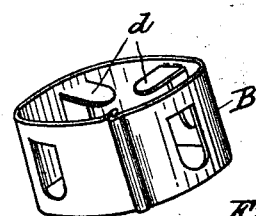

Figure 1 is an elevation of my improved fumigator in its simplest form; Fig. 2, a perspective view of the support for the paraform tablet shown in Fig. 1, and Fig. 3 a sectional view of a modified form in which the mixture containing the material which gives off formaldehyde gas when heated is pressed into a suitable container.

Referring to Figs. 1 and 2, A is a tubular tablet containing paraform or other substance which when heated reverts to or gives off formaldehyde gas. This tablet is supported upon a carrier B, which may be made of tin or any other suitable material, preferably non-combustible. As shown, the support is intended to be stamped from tin or other sheet metal in one piece. The legs are formed by punching out strips $d$, which are bent inward on a horizontal line, so as to afford a support for the heater C. This heater, as above stated, is molded into the desired form, preferably cylindrical, and is composed of a mixture of charcoal, about two per cent. of niter (commercial nitrate of potash or nitrate of soda,) and an adhesive solution. It will be noted that the bore of the tablet A is larger than the diameter of the heater C, so that when the heater is placed in position there will be sufficient space to give the required draft. The heater may be ignited either at the top or bottom, but preferably at the bottom, so that it will burn upward. It will be seen that the tubular tablet A forms a jacket for the heater and confines the heat to a large extent, and thus performs the function of the metallic container of my patent above referred to.

Figure 3:
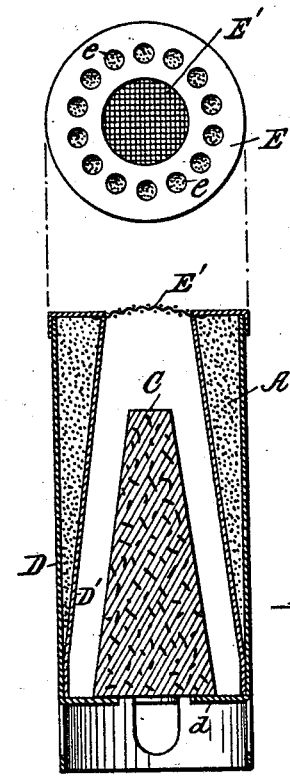

In practice for the purposes of transportation and to guard against breakage in use and to facilitate manufacture I prefer to place the completed tablet or the mixture employed in making the tablet in a container made of any suitable non-combustible material, such as tin or asbestos, or cardboard made non-combustible by any suitable process—such, for instance, by coating the cardboard with silicate of soda or silicate of potash or by dipping the cardboard in a solution of phosphate of ammonia or carbonate of ammonia and subsequently drying the same. In Fig. 3 I have illustrated such a container made of tin in cylindrical form. This container preferably has an outer cylindrical wall D and an inner wall D', tapering toward the top. The mixture A is pressed into the chamber formed by the walls D and D', and, if desired, I may provide a cap composed of a ring E, provided with holes $e$, and a piece of wire-gauze E', the function of the latter being to prevent any possibility of the formaldehyde gas becoming ignited. The heater C is supported by strips $d$, punched from the outer wall D and bent upward, as shown. The shape of the heater will correspond to the shape of the inner wall D', and its diameter throughout will be less than that of the inner bore of the container, so as to leave an air-space around the heater. The holes formed at the bottom of the outer wall D by punching out strips $d$ will permit entrance of air to give draft and support combustion. In practice the heater will be ignited at the bottom.

In some instances instead of making a mixture containing a polymer of formaldehyde, as above stated, I may make a tubular tablet composed of three parts of plaster-of-paris and two parts formaldehyde solution. In heating such a tablet formaldehyde gas is regenerated and mixes or combines with the watery vapor given off and prevents repolymerization. Instead of making a tablet of plaster-of-paris mixed with the formaldehyde solution I may fill the container shown in Fig. 3 with such mixture.

I do not claim herein the tablet or the combination of the tablet and the heater, since this feature of my invention is claimed in my application filed March 22, 1902, Serial No. 99,393, of which this application is a division.

What I claim is—

1. As a new article of manufacture, a noncombustible tubular container having a double wall, a mixture placed between the walls of said container composed of a polymer of formaldehyde, water, and an ingredient which raises the vaporizing-point of the water when heated and which mixture when heated gives off simultaneously formaldehyde gas and watery vapor, and a heater within said container.

2. As a new article of manufacture, a noncombustible tubular container having a double wall, a mixture placed between the walls of said container composed of a polymer of formaldehyde, water, and a chemical salt and which mixture when heated gives off simultaneously formaldehyde gas and watery vapor, and a heater within said container.

3. As a new article of manufacture, a noncombustible container having a cylindrical outer wall and an inner wall tapering toward the top forming a receptacle, a material between the walls of said container which when heated gives off a disinfecting-gas, and a heater within said container.

4. As a new article of manufacture, a noncombustible container having a cylindrical outer wall and an inner wall tapering toward the top, a mixture between the walls of said container which when heated gives off simultaneously formaldehyde gas and watery vapor, and a heater within said container.

5. As a new article of manufacture, a noncombustible container having a cylindrical outer wall and an inner wall tapering toward the top, a material between the walls of said container which when heated gives off formaldehyde gas, and a block supported within the inner wall of said chamber and containing charcoal and a substance which supports combustion.

6. As a new article of manufacture, a noncombustible container having a cylindrical outer wall and an inner wall tapering toward the top, a material between the walls of said container which when heated gives off formaldehyde gas, and a long tapering block supported within the inner wall of said chamber and containing charcoal and a substance which supports combustion.

7. As a new article of manufacture, a noncombustible container having a cylindrical outer wall and an inner wall tapering toward the top, a material between the walls of said container which when heated gives off formaldehyde gas, a perforated cap for said container, and a heater within said container.

8. As a new article of manufacture, a noncombustible container having a cylindrical outer wall and an inner wall tapering toward the top, a material between the walls of said container which when heated gives off formaldehyde gas, a cover for said container, comprising a piece of wire-gauze covering the opening formed by the inner wall and an annular perforated cap covering the chamber formed by the two walls, and a heater within said container.

9. As a new article of manufacture, a noncombustible container having a cylindrical outer wall and an inner wall tapering toward the top, a material between the walls of said container which when heated gives off formaldehyde gas, supports $d$ punched from the lower portion of the outer wall, and a block containing charcoal and a substance which supports combustion carried by said supports.

10. As a new article of manufacture, a noncombustible container having a cylindrical outer wall and an inner wall tapering toward the top, a material between the walls of said container which when heated gives off formaldehyde gas, a cover for said container comprising a piece of wire-gauze and an annular perforated cap, supports $d$ punched from the lower portion of the outer wall, and a block containing charcoal and a substance which supports combustion carried by said supports.

11. A container for a volatile disinfecting composition formed of an outer tube and a tapering inner tube, a support within the outer tube near its base, a heater mounted upon said support, and extending into said inner tube.

12. A container for disinfecting compositions having an outer casing and a tapering inner wall, a support formed of struck-in portions of the casing, and a heater mounted on said support and within said inner wall.

13. A container for disinfecting compositions having an outer metallic casing, a tapering inner wall secured within the outer casing, a support within the casing at its base, and a heater mounted upon said support.

This specification signed and witnessed this 5th day of June, 1902.

LEON FEVAL.

Witnesses:
 WM. PELZER,
 HUGO BOEPPLE.